(12) United States Patent
Morita et al.

(10) Patent No.: US 6,310,148 B1
(45) Date of Patent: Oct. 30, 2001

(54) STRYRENE RESIN COMPOSITION AND PROCESS FOR PRODUCING THE SAME

(75) Inventors: Tsuyoshi Morita, Chiba; Mamoru Fujihira, Funabashi; Jiro Matsuo, Chiba, all of (JP)

(73) Assignee: Dainippon Ink and Chemicals, Ltd., Tokyo (JP)

( * ) Notice: Subject to any disclaimer, the term of this patent is extended or adjusted under 35 U.S.C. 154(b) by 0 days.

(21) Appl. No.: 09/509,504

(22) PCT Filed: Jul. 30, 1999

(86) PCT No.: PCT/JP99/04105

§ 371 Date: Mar. 28, 2000

§ 102(e) Date: Mar. 28, 2000

(87) PCT Pub. No.: WO00/06623

PCT Pub. Date: Feb. 10, 2000

(30) Foreign Application Priority Data

Jul. 30, 1998 (JP) .................................................. 10-214681

(51) Int. Cl.⁷ .............................. C08L 51/04; C08L 51/00
(52) U.S. Cl. ........................... 526/88; 526/216; 526/920; 524/504; 525/69; 525/80; 525/84
(58) Field of Search ................................. 525/69, 84, 80; 526/88, 216, 920; 524/504

(56) References Cited

U.S. PATENT DOCUMENTS

| | | | |
|---|---|---|---|
| 4,287,312 | 9/1981 | Yusa et al. | 525/83 |
| 4,607,080 | 8/1986 | Yusa et al. | 525/82 |
| 4,631,307 | 12/1986 | Hosoda et al. | 524/269 |
| 4,656,212 | 4/1987 | Hosoda et al. | 524/269 |
| 5,231,142 | * 7/1993 | Tsubokura et al. | . |
| 5,256,732 | 10/1993 | Morita et al. | . |
| 5,475,055 | 12/1995 | Deckers et al. | 525/77 |

FOREIGN PATENT DOCUMENTS

| | | |
|---|---|---|
| 0 471 550 A2 | 2/1992 | (EP) . |
| 4-180907 | 6/1992 | (JP) . |
| 5-1122 | 1/1993 | (JP) . |
| 5-331245 | 12/1993 | (JP) . |
| 6-16744 | 1/1994 | (JP) . |
| 6-128339 | 5/1994 | (JP) . |
| WO 96/24633 | 8/1996 | (WO) . |

* cited by examiner

*Primary Examiner*—Tae H. Yoon
(74) *Attorney, Agent, or Firm*—Armstrong, Westerman, Hattori, McLeland & Naughton, LLP

(57) ABSTRACT

A styrene resin composition excellent in luster, rigidity and surface impact strength is provided. A mixed solution of (b1) a homopolymer of a diene monomer or (b2) a copolymer of a styrene monomer and a diene monomer, the copolymer having 15% or less on a weight basis of the styrene structure units, (b3) a copolymer of a styrene monomer and a diene monomer, the copolymer having 20 to 50% on a weight basis of the styrene structure units, (a1) a styrene monomer, and (a2) a (meth)acrylic acid alkyl ester is continuously bulk polymerized in a continuous bulk polymerization line having incorporated therein a tubular reactor with a plurality of mixing elements that have no mobile part fixed inside thereof.

13 Claims, 2 Drawing Sheets

STRYRENE RESIN COMPOSITION AND PROCESS FOR PRODUCING THE SAME

TECHNICAL FIELD

The present invention relates to a rubber modified styrene resin composition in which a grafted rubbery polymer is dispersed in a styrene matrix resin. More particularly, the present invention relates to a styrene resin composition that is remarkably excellent in impact resistance, in particular surface impact strength, and in addition in luster and rigidity and to a method for producing the same.

BACKGROUND ART

Rubber modified styrene resins such as HIPS (high impact polystyrene) are now widely used as thermoplastic resins having excellent impact resistance. Such rubber modified styrene resins represented by HIPS generally have a dispersed rubber particle diameter as large as 1 μm or more and as a result they have a defect that their molded products have a poor luster.

Accordingly, development of resins that have both acceptable luster and the impacts resistance of HIPS has been promoted. For example, Japanese Unexamined Patent Application, First Publication No. Hei 5-1122 discloses a technology of reducing the particle diameter of grafted rubber particles in HIPS to 0.5 to 1.0 micron to impart both luster and impact resistance thereto.

Also, Japanese Unexamined Patent Application, First Publication No. Hei 4-180907 discloses a technology of providing a resin composition that has excellent transparency, rigidity and impact resistance by graft polymerizing styrene and methyl methacrylate with a rubber component.

However, in the technology described in Japanese Unexamined Patent Application, First Publication No. Hei 5-1122, although a reduction in rubber particle diameter increases the luster to some extent, the reduction in particle diameter is accompanied by a serious decrease in impact strength, so that in order to obtain products having a decreased rubber particle diameter and high impact strength, the rubber content in the product must be higher than in common HIPS, and as a result rigidity, which is one of the characteristic features of styrene resins, is decreased. Further, use of more rubber component with smaller particle diameters has a problem regarding impact strength that the resultant composition is low in practically important surface impact strength but is high in notched Izod impact strength.

Also, the resin composition described in Japanese Unexamined Patent Application, First Publication No. Hei 4-180907 has transparency so that it has a good luster but in order to impart transparency, the particle diameter must be decreased further and as a result the resultant composition has an insufficient impact strength, thereby finding only limited applications.

DISCLOSURE OF INVENTION

A problem that the present invention is to solve is to provide a styrene resin composition that is excellent in luster, rigidity and surface impact strength.

Under the circumstances, the present inventors have carried out intensive studies and as a result have found that graft polymerization of a styrene monomer and a (meth)acrylic acid alkyl ester with a mixed rubbery polymer containing two specified rubber components dissolved therein, reduction of the median diameter on a volume basis of dispersed rubber particles, and increase in the degree of crosslinking thereof result in a composition for a molded product having excellent luster and yet having a remarkably increased rigidity and impact strength for practical use, thereby completing the present invention.

That is, the present invention relates to a styrene resin composition having a copolymer (A) of a styrene monomer and an acrylic monomer as a matrix phase and a rubber particle (B) comprising a diene rubbery polymer with which a styrene monomer and an acrylic monomer are graft copolymerized as a dispersed particle, wherein the copolymer (A) is a copolymer of the styrene monomer and the (meth)acrylic acid alkyl ester in a proportion of the former/latter=95/5 to 50/50 on a weight basis, and wherein the rubber particle (B) has a median diameter in the range of 0.5 to 0.9 μm on a volume basis and a value of (toluene-insoluble solids content at 25° C./toluene swelling index at 25° C.) is in the range of 1.2 to 2.5; and to a method for producing a styrene resin comprising continuously bulk polymerizing, in a continuous bulk polymerization line having incorporated therein a tubular reactor with a plurality of mixing elements that have no mobile portion fixed inside thereof, a mixed solution of (b1) a homopolymer of a diene monomer, or (b2) a copolymer of a styrene monomer and a diene monomer, the copolymer having 15% or less on a weight basis of the styrene structure units, and (b3) a copolymer of a styrene monomer and a diene monomer, the copolymer having 20 to 50% on a weight basis of the styrene structure units, (a1) a styrene monomer, and (a2) a (meth)acrylic acid alkyl ester.

BEST MODE FOR CARRYING OUT THE INVENTION

Figure 1:
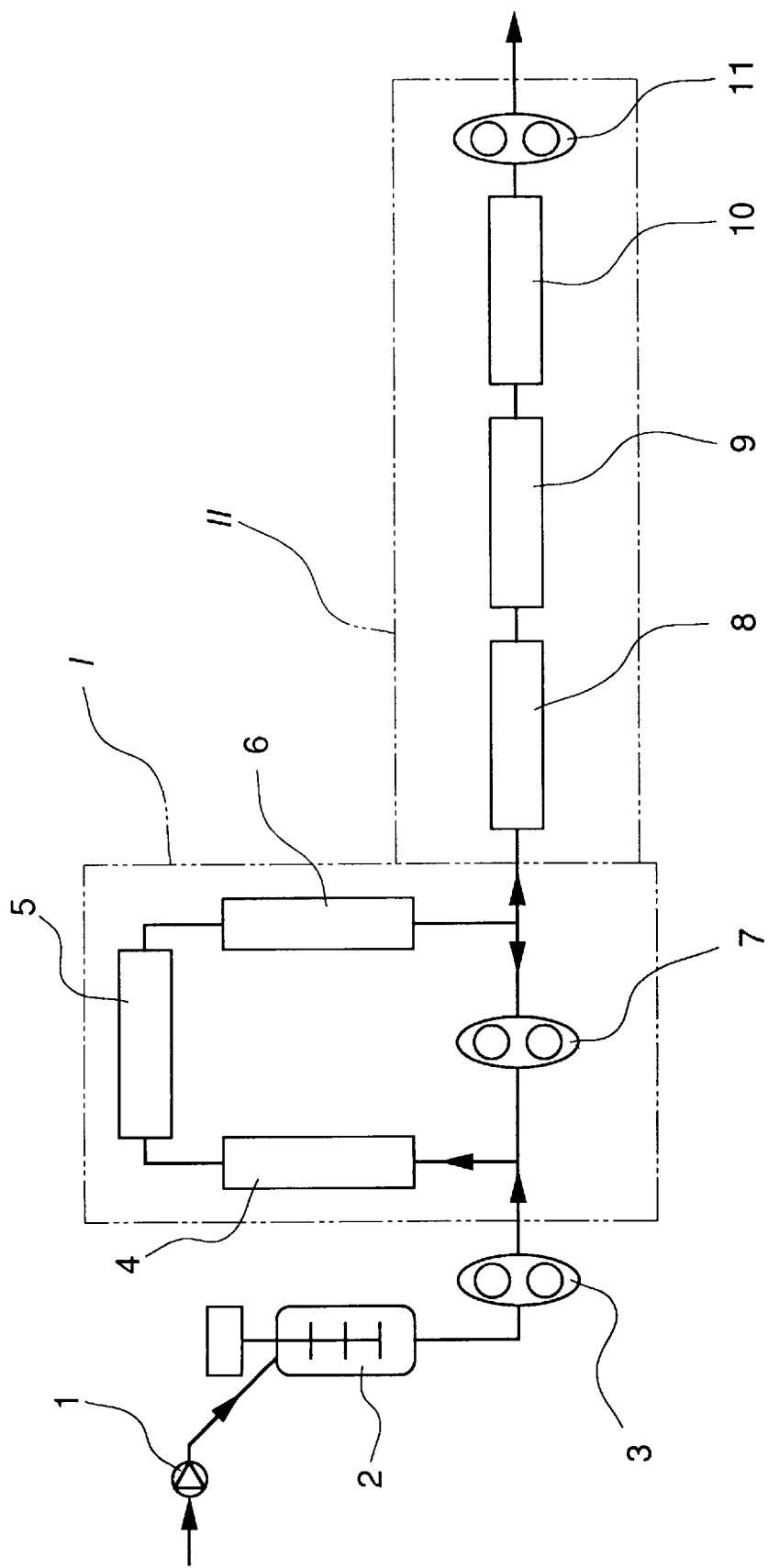
FIG. 1 is a flow chart illustrating an example of continuous bulk polymerization line having incorporated therein a tubular reactor having static mixing elements.

In the present invention, the copolymer (A) of a styrene monomer and an acrylic monomer that forms a matrix phase is a copolymer of a styrene monomer and a (meth)acrylic acid alkyl ester in a proportion on a weight basis of the former/latter=95/5 to 50/50. Here, in the case where the (meth)acrylic acid alkyl ester exceeds 50% by weight, the flowability of the composition is decreased and the transferability from a mold is adversely affected so that the luster of the product is remarkably decreased. Also, in the case where it is below 5% by weight, the impact strength and rigidity of the product are decreased.

As in the case of the resin composition described in Japanese Unexamined Patent Application, First Publication No. Hei 4-180907 cited above, those compositions which contain a large amount of acrylic components such that the acrylic acid alkyl ester content in the matrix is 40 to 70% by weight have the serious defect in practical use that their molded products cannot he reused by being blended in polystyrene, etc., after being molten again, i.e., they cannot be recycled, as well as the defect that they are poor in a so-called chemical resistance since they are vulnerable to corrosion by solvents; for example, when printing is carried out on molded articles, they tend to be corroded by the ink, causing cracks.

Therefore, in view of the points that recycling such as blending recovered products in polystyrene is possible while maintaining the performances of the present invention such as luster, impact strength and rigidity of molded articles, the copolymer (A) is preferably a copolymer of the styrene monomer and the (meth)acrylic acid alkyl ester in a proportion of the former/latter=95/5 to 81/19 on a weight basis.

Here, the styrene monomer includes, for example, styrene, α-styrene, o-methylstyrene, m-methylstyrene, p-methylstyrene, ethylstyrene, isobutylstyrene, tert-butylstyrene, o-bromostyrene, m-bromostyrene, p-bromostyrene, o-chlorostyrene, m-chlorostyrene, p-chlorostyrene, etc. Of these, styrene is preferred.

Also, the alkyl (meth)acrylate is an essential component that imparts the rubber modified copolymer resin of the present invention with surface impact strength and rigidity and specifically includes methyl (meth)acrylate, ethyl (meth)acrylate, propyl (meth)acrylate, n-butyl (meth) acrylate, iso-butyl (meth)acrylate, 2-ethylhexyl (meth) acrylate, etc. In respect of costs, surface impact strength and rigidity, methyl (meth)acrylate is preferred. Also, these alkyl (meth)acrylates may be used singly or two or more of them may be used in combination. In particular, in respect of luster, it is preferred to use methyl (meth)acrylate and n-butyl (meth)acrylate in combination. In this case, the amount of n-butyl (meth)acrylate is not limited particularly but it is preferably 1 to 8 parts by weight, particularly 2 to 5 parts by weight, based on 100 parts of the total weight of the raw material monomer.

The copolymer (A) that forms the matrix may, within a range where the effects of the present invention are not damaged, contain other copolymerizable monomers, for example, vinyl-cyan compounds such as (meth) acrylonitrile; polymerizable unsaturated fatty acids such as (meth)acrylic acid, itaconic acid, maleic acid, fumaric acid, crotonic acid, and cinnamic acid; maleimides such as N-methylmaleimide, N-ethylmethylmaleimide, N-butylmethylmaleimide, N-octylmethylmaleimide, N-isopropylmethylmaleimide, N-phenylmethylmaleimide, N-p-bromophenylmethylmaleimide, N-o-chlorophenylmethylmaleimide, and N-cyclohexylmethylmaleimide; unsaturated carboxylic anhydrides represented by maleic anhydride, itaconic anhydride, citraconic anhydride, etc.; and amino group-containing unsaturated compounds such as allylamine, aminoethyl (meth)acrylate, and aminopropyl (meth)acrylate; acrylamide compounds such as acrylamide and N-methylacrylamide.

The proportion of the other copolymerizable monomer which can be used is not limited particularly but is preferably 5% by weight or less based on the total monomer components that form the copolymer (A).

Next, the rubber particle (B) dispersed in the above-mentioned matrix is a graft copolymer that comprises a diene rubbery polymer with which a styrene monomer and an acrylic monomer are graft copolymerized and is characterized by having a median diameter in the range of 0.5 to 0.9 μm on a volume basis as measured by a dispersion type particle size distribution measuring apparatus and by a value of (toluene-insoluble solids content at 25° C./toluene swelling index at 25° C.) being in the range of 1.2 to 2.5.

That is, the rubber particle (B) having a median diameter in the range of 0.5 to 0.9 μm on a volume basis as measured by a dispersion type particle size distribution measuring apparatus results in a very excellent luster of molded product. Usually, with such a small dispersed particle diameter, the graft polymer has a decreased crosslinked polymer content and the value of toluene-insoluble solids content at 25° C./toluene swelling index at 25° C. is below 1.0 while in the present invention, this value being in the range of 1.2 to 2.5 remarkably increases the rigidity and impact strength, particularly surface impact strength, of the molded product.

Here, by the term "toluene-insoluble solids content" is meant a value obtained by precisely weighing 1 g of a sample, dissolving the sample in 100 ml toluene at 25° C. over 24 hours, taking out the swelled insoluble matter, drying it, weighing the dry resin, and expressing the obtained weight of the dry resin relative to the weight of the sample in percentage. In the present invention, this value is preferably 13 to 20% by weight.

Also, by the "toluene swelling index at 25° C." is meant a value obtained by precisely weighing 1 g of a sample, dissolving the sample in 100 ml toluene at 25° C. over 24 hours, taking oust the swelled insoluble matter, weighing the insoluble solids, then drying it, weighing the dry resin, and expressing the weight insoluble solids by the weight of the dry resin. In the present invention, this index is preferably 10 to 15% by weight.

In the present invention, as described above, the value of toluene-insoluble solids content at the 25° C./toluene swelling index at 25° C. is in the range of 1.2 to 2.5, with values below 1.2 resulting in decreased rigidity and decreased impact strength whereas with values exceeding 2.5 giving a good rigidity but poor surface impact strength. In the present invention, in respect of further improved surface impact strength and Izod impact strength, the value is preferably in the range of 1.2 to 2.0.

Also, the rubber particle (B), the dispersed particle, is a graft copolymer of a diene rubbery polymer with which a styrene monomer and an acrylic monomer are graft copolymerized. Here, the diene rubbery polymer is not limited particularly and includes homopolymers of diene monomers, such as polybutadiene, low cis-polybutadiene, and high cis-polybutadiene or copolymers of a styrene monomer and a diene monomer. As described in detail hereinbelow, in the present invention, it is preferred to use in combination (b1) a homopolymer of a diene monomer, or (b2) a copolymer of a styrene monomer and a diene monomer, the copolymer having 15% or less on a weight basis of the styrene structure units, and (b3) a copolymer of a styrene monomer and a diene monomer, the copolymer having 20 to 50% on a weight basis of the styrene structure units, in the graft copolymerization.

The rubbery polymer (b1) used in the present invention is a homopolymer of a diene monomer as described previously, and includes, for example, polybutadiene, low cis-polybutadiene, and high cis-polybutadiene.

Also, the copolymer (b2) of a styrene monomer and a diene monomer, the copolymer having 15% or less on a weight basis of the styrene structure units, may be of block or random bonding. Here, the styrene monomer constituting the copolymer rubber of a styrene monomer and a diene monomer includes, for example, styrene, α-styrene, o-methylstyrene, m-methylstyrene, p-methylstyrene, ethylstyrene, isobutylstyrene, tert-butylstyrene, o-bromostyrene, m-bromostyrene, p-bromostyrene, o-chlorostyrene, m-chlorostyrene, p-chlorostyrene, etc. Of these, styrene is preferred in respect of excellent reactivity with the diene monomer.

On the other hand, the diene monomer reacted with the above-mentioned styrene monomer includes butadiene, chloroprene, isoprene, 1,3-pentadiene, etc. Of these, butadiene is preferred in respect of excellent reactivity with the styrene monomer.

Therefore, the copolymer (b2) is preferably a styrene/butadiene copolymer rubber that contains styrene structure units in the range of 15% or less on a weight basis.

The above-mentioned rubbery polymer (b1) or copolymer (b2) is preferably one that contains 8 to 35% by weight of 1,2-vinyl bonds among the unsaturated bonds based on the diene monomer since it has an increased toluene-insoluble solids content in the rubber modified copolymer resin and since it can inhibit the progress of crosslinking at high temperatures during its production, establishing a good balance between the graft ratio and the degree of crosslinking to increase the rubber elasticity.

Also, the rubbery copolymer (b1) or copolymer (b2) is preferably one that has a viscosity in a 5% by weight styrene solution of 30 to 50 centipoises since it has a great impact resistance improving effect and since it is easy to control the rubber particle diameter thereof upon production. Particularly preferred is one that has a viscosity in a 5% by weight styrene solution at 25° C. of 30 to 45 centipoises and a Mooney viscosity of 20 to 80 using an L-rotor at 100° C.

Next, the copolymer (b3) used in combination with the above-mentioned rubbery polymer (b1) or copolymer (b2) is a copolymer of a styrene monomer and a diene monomer, the copolymer having 20 to 50% on a weight basis of the styrene structure units. The mode of bonding in the copolymer is preferably by block bonding or tapered block bonding.

The above-mentioned rubbery polymer (b3) is preferably one that has a proportion of 1,2-vinyl bonds of 8 to 35% by weight among the unsaturated bonds based on the diene monomer, since such a polymer has an increased toluene-insoluble solids content in the rubber modified copolymer resin, it can inhibit the progress of crosslinking at high temperatures during its production, and it establishes a good balance between the graft ratio and the degree of crosslinking to increase the rubber elasticity, so that the impact resistance is remarkably improved. In this case, the remainder of 1,2-vinyl bonds form cis- and trans-bonds.

Further, the rubbery polymer (b3) is preferably one that has a viscosity in a 5% by weight styrene solution of 5 to 50 centipoises since it has a great impact resistance improving effect and since it is easy to control the rubber particle diameter thereof upon production. Particularly preferred is one that has a viscosity in a 5% by weight styrene solution at 25° C. of 8 to 40 centipoises and a Mooney viscosity of 20 to 80 using an L-rotor at 100° C.

The rubbery polymer (b1) or copolymer (b2) and copolymer (b3) described in detail above are dissolved in the styrene monomer (a1) and acrylic acid alkyl ester (a2), and then they are graft polymerized to form the rubber particle (B).

The configuration of the rubber particle (B) that exists in the matrix is not limited particularly but the internal structure of the rubber particle is preferably one that takes the form of a so-called "salami structure" in respect of impact strength, particularly surface impact strength.

More specifically, the dispersion state of the rubber particle (B) in the composition is preferably one in which the rubber particle (B1) that takes the form of salami structure and the rubber particle (B2) that has a core-shell structure coexist and the proportion (B1)/(B2), which is the abundance ratio of the rubber particles (B1) to the rubber particles (B2) as observed by transmission electron micrographs (magnification ×10,000) of 1,000 particles,=70/30 to 95/5 in respect of a good balance between luster and surface impact strength. That is, in the present invention, most rubber particles are of a salami structure in spite of their small particle diameters, so that there can be obtained molded products that have excellent surface impact strength without sacrificing the luster. The rubber particles (B) other than the rubber particles (B1) that have a salami structure are rubber particles (B2) that have a core-shell structure, so that the luster of molded products is excellent.

Also, the rubber particle (B) in the composition has a median diameter in the range of 0.5 to 0.9 μm on a volume basis as measured using a dispersion type particle size distribution measuring apparatus as described above. In this case, particle size distribution is preferably of a single-peak in respect of luster and surface impact strength. That is, in the present invention, the rubbery polymer (b1) or copolymer (b2) and copolymer (b3) are dissolved in the styrene monomer (a1) and (meth)acrylic acid alkyl ester (a2), and then they copolymerized to obtain a single-peak particle size distribution of the resulting rubber particle (B) even when two kinds of rubbery substances are used in combination to thereby balance the luster and the rigidity and surface impact strength.

Also, the rubber particle (B) in the present invention may contain as the raw material component of graft copolymerization not only each of the above components but also other copolymerizable monomers in a range in which the effects of the present invention are not damaged. The other copolymerizable monomers used here include, for example, vinyl-cyan compounds such as (meth)acrylonitrile; polymerizable unsaturated fatty acids such as (meth)acrylic acid, itaconic acid, maleic acid, fumaric acid, crotonic acid, and cinnamic acid; maleimides such as N-methylmaleimide, N-ethylmethylmaleimide, N-butylmethylmaleimide, N-octylmethylmaleimide, N-isopropylmethylmaleimide, N-phenylmethylmaleimide, N-p-bromophenylmethylmaleimide, N-o-chlorophenylmethylmaleimide, and N-cyclohexylmethylmaleimide; unsaturated carboxylic anhydrides represented by maleic anhydride, itaconic anhydride, citraconic anhydride, etc.; and amino group-containing unsaturated compounds such as allylamine, aminoethyl (meth)acrylate, and aminopropyl (meth)acrylate; acrylamide compounds such as acrylamide and N-methylacrylamide.

As for the method for producing the composition of the present invention, as described previously, the diene rubbery polymer, the styrene monomer (a1), the acrylic monomer (a2) and optionally other copolymerizable monomers may be graft copolymerized by bulk-suspension polymerization, solution polymerization or bulk polymerization. Of these, continuous bulk polymerization is preferred in respect of productivity and costs.

Also, in the case where there is used as a diene rubbery polymer a polymer obtained by compatibilization of the rubbery polymer (b1) or the copolymer (b2) and the copolymer (b3) with components (a2) and (a3) and subsequent graft copolymerization of the styrene monomer (a2) and (meth)acrylic acid alkyl ester (a3), it is preferred that use be made of the production method of the present invention as described in detail hereinbelow.

That is, it is preferred that a mixed solution of
(b1) a homopolymer of a diene monomer or (b2) a copolymer of a styrene monomer and a diene monomer, the copolymer having 15% or less on a weight basis of the styrene structure units, and (b3) a copolymer of a styrene monomer and a diene monomer, the copolymer having 20 to 50% on a weight basis of the styrene structure units,
(a1) a styrene monomer, and
(a2) a (meth)acrylic acid alkyl ester, be subjected to continuous bulk polymerizing in a continuous bulk polymerization line having incorporated therein a tubular reactor with a plurality of mixing elements having no mobile part fixed inside thereof because the particle diameter of the rubber particle (B) can be made uniform and smaller.

Here, the ratio of the polymer (b1) or copolymer (b2) used to the copolymer (b3) is preferably ((b1) or (b2))/(b3)=95/5 to 60/40 in that the adjustment of particle diameter and configuration of finally obtained rubber particle (B) is facilitated, that is, the average particle diameter of the rubber particle (B) can be made smaller while increasing the content of salami structure therein and the resin composition of this invention can have luster, rigidity and surface impact strength at the same time, which is the object of the present invention. Also, the styrene content in the total weight of the polymer (b1) or the copolymer (b2) and the copolymer (b3) is preferably 8 to 20% by weight in respect of a good balance between the luster and surface impact strength thereof.

The proportion of each component used in the graft copolymerization which takes place after compatibilization of the polymer (b1) or the copolymer (b2) and the copolymer (b3) with the styrene monomer (a1) and (meth)acrylic acid alkyl ester (a2) is not limited particularly but usually the weight proportion of (b')/((a1)+(a2)) is 3/97 to 16/84 and it is preferred to use the styrene monomer (a1) and (meth)acrylic acid alkyl ester (a2) in a proportion on a weight basis of (a1)/(a2)=95/5 to 50/50, preferably 95/5 to 81/19 in respect of remarkable effects of the present invention.

To describe the production method of the present invention in further detail, it is preferred in respect of uniformity of the resultant composition and ease of adjusting the particle diameter of grafted rubber particle in the above-mentioned range that respective raw materials of the polymer (b1) or the copolymer (b2), the copolymer (b3). the styrene monomer (a1), and the (meth)acrylic acid alkyl ester (a2) are dissolved in the above-mentioned use proportions, reacted in at least one stirring type reactor, and introduced into a tubular reactor with static mixing elements.

Also, the continuous bulk polymerization line having incorporated therein a tubular reactor with static mixing elements, that is, a tubular reactor with a plurality of mixing elements having no mobile part fixed therein is preferably a polymerization line constituted by a. a stirring type reactor,
b. an initial polymerization line connected to the stirring type reactor, comprising at least one tubular reactor having a plurality of mixing elements having no mobile part fixed therein,
c. a main polymerization line connected to the initial polymerization line, comprising at least one tubular reactor having a plurality of mixing elements having no mobile part fixed therein, and
d. a recycle line branching between the initial polymerization line and the main polymerization line.

Hereafter, a description will be given of an example of production method for producing rubber modified copolymer resin using this continuous bulk polymerization line with reference to FIG. 1.

FIG. 1 is a flow chart illustrating an example of continuous bulk polymerization line having incorporated therein a tubular reactor with static mixing elements.

A mixed solution containing as essential components a polymer (b1) or a copolymer (b2), a copolymer (b3), a styrene monomer (a1) and a (meth)acrylic acid alkyl ester (a2), fed by a plunger pump 1, is first sent to a stirring type reactor 2, where initial polymerization is allowed to occur with stirring, and then the reaction mixture is sent by a gear pump 3 to a circulation polymerization line I having tubular reactors 4, 5 and 6 and a gear pump 7.

The combination of initial graft polymerization in the stirring type reactor 2 with the circulation polymerization line I is preferred in that no excessive shearing is applied to the rubber particles so that more efficient particle size reduction is possible so that the polymer composition in the polymerization step can be made uniform. The initial polymerization in this case is performed such that the total polymerization conversion of styrene monomer (a1) and (meth)acrylic acid alkyl ester (a2) is 10 to 28% by weight, preferably 14 to 24% by weight, at an outlet of the reactor 2. The stirring type reactor 2 includes, for example, a stirring tank reactor, a stirring tower reactor, etc., and the stirring blade includes, for example, anchor type, turbine type, screw type, and double helical type blades.

In the present invention, in order to reduce the viscosity of the above-mentioned solution in the reactor, a solvent may be used and its amount is 5 to 20 parts by weight per 100 parts by weight of the total of raw material monomers. As for the kinds of solvent, those solvents that are usually used in bulk polymerization, such as toluene, ethylbenzene, and xylene, are suitable.

Also, in the present invention, it is preferred that a chain transfer agent be added to the above-mentioned mixed solution in order to control the molecular weight of the rubber modified copolymer resin. The amount of the chain transfer agent is usually in the range of 0.005 to 0.5 part by weight per 100 parts by weight of the total of raw material monomers. The mixed solution which has been subjected to initial graft polymerization under dynamic stirring as described above is then subjected to graft polymerization while it is circulating in the circulation polymerization line I and a portion thereof is continuously sent to a non-circulation polymerization line II in which tubular reactors 8, 9 and 10 with static mixing elements are incorporated in series.

The rubber particles in the mixed solution in the circulation polymerization line I are statically mixed and stabilized and their particle diameter is fixed while they are circulating in the circulation polymerization line I. In this case, the recycle ratio (R) and polymerization conversion of total of (a1) and (a2) will be key factors. The recycle ratio R is usually R=F1/F2 in the range of 3 to 15 assuming that F1 is a flow rate (liter/hour) of the mixed solution recycling in the circulation polymerization line I without flowing out to the non-circulation polymerization II and F2 is a flow rate (liter/hour) of the mixed solution that flows out of the circulation polymerization line I to the non-circulation polymerization line II, and particularly preferably in the range of R=5 to 10 in that the pressure loss in the tubular reactor is small, the resultant rubbery polymer particles are stable so that particle size can be reduced, and the content ratio of the styrene monomer (a1) and (meth)acrylic acid alkyl ester (a2) can be retained at a constant value.

Also, the graft polymerization in the circulation polymerization line I is performed such that the total polymerization conversion of (a1) and (a2) at the outlet of the circulation polymerization line I is usually 35 to 55% by weight, preferably 40 to 50% by weight. The polymerization temperature is suitably 120 to 135° C.

The mixed solution graft polymerized in the circulation polymerization line I is then fed to the non-circulation polymerization line II, where graft polymerization is performed continuously at a polymerization temperature of usually 140 to 160° C. until the total conversion of the styrene monomer (a1) and (meth)acrylic acid alkyl ester (a2) reaches 60 to 85% by weight.

Next, the mixed solution is sent by a gear pump 11 to a preheater and then to a volatile substance removing tank, where unused monomers and solvents are removed under reduced pressure, and pelletized to obtain the targeted rubber modified copolymer resin. In this case, the preheating and volatile substance removal be performed under such conditions that an increase in conversion in the preheater and volatile substance removing tank is 7% by weight or less.

The plurality of mixing elements fixed inside the tubular reactor having static mixing elements used in the present invention include, for example, those that divide the polymerization solution that has flown into the tube and change the direction of its flow and repeat such a division and combination to mix the polymerization solution. Such a tubular reactor includes, for example, SMX model and SMR model Sulzer tubular mixers, Koenigs static mixers, Toray tubular mixers, etc. The SMX type and SMR type Sulzer tubular mixers are particularly preferred.

The number of such tubular reactors incorporated in the circulation polymerization line I or non-circulation polymerization line II is not limited particularly in the case of the above-described tubular reactors since it depends on its length and the structure of the mixing element but reactors having 4 or more mixing elements are used in combination in a number of 4 to 15, preferably 6 to 10. Of these, the number of tubular reactors to be incorporated in the circulation polymerization line I is usually 1 to 10, preferably 2 to 6.

It is preferred to add an organic peroxide that releases free radicals upon decomposition as a polymerization initiator to the mixed solution used in the present invention as a raw material, if desired, since grafting and acceleration of the reaction can be done at relatively low temperatures. The addition amount is in the range of 0.005 to 0.04 part by weight per 100 parts by weight of total of raw material monomers.

The organic peroxide used herein is preferably one that has a temperature of 75 to 170° C. at which the half time is 10 hours and specific examples thereof include peroxy ketals such as 1,1-di-t-butylperoxycyclohexane, 1,1-di-t-butylperoxy-3,3,5-trimethylcyclohexane, 1,1-di-t-butylperoxy-2-methylcyclohexane, 2,2-bis(4,4-di-t-butylperoxycyclohexyl)propane, 2,2-di-t-butylperoxyoctane, n-butyl 4,4-di-t-butylperoxyvalerate, and 2,2-di-t-butylperoxybutane; peroxy esters such as t-butyl peroxyacetate, t-butyl peroxy-3,5,5-trimethylhexanoate, t-butyl peroxylaurate, t-butyl peroxybenzoate, t-butyl peroxymetatoluate, di-t-butyl peroxyisophthalate, 2,5-dimethyl-2,5-dibenzoylperoxyhexane, t-butyl peroxymaleate, t-butyl peroxyisopropyl carbonate, di-t-butyl peroxide, dicumyl peroxide, t-butyl hydroperoxide, and cumene hydroperoxide; and the like, which are used singly or as combinations of two or more of them.

The styrene resin composition thus obtained, as described previously, is preferably one that has a toluene-insoluble solids content of 13 to 20% by weight and a toluene swelling index at 25° C. of 10 to 15 and the value of their ratio (toluene-insoluble solids content at 25° C./toluene swelling index at 25° C.) is 1.2 to 2.5.

Also, the copolymer of (a1) and (a2), which is the matrix phase in the resin, is preferably one that has a weight-average molecular weight (Mw) of 140,000 to 200,000 and a ratio (Mw/Mn) of weight-average molecular weight (Mw) to number-average molecular weight (Mn) is 1.8 to 2.5, in particular one that has a weight-average molecular weight (Mw) of 160,000 to 180,000 is preferred in respect of excellent impact strength, rigidity and resistance to chemicals.

The combined use of a silicone oil in addition to the above-mentioned copolymer (A) and rubber particle (B) in the composition of the present invention can further increase the luster of molded products. The silicone oil is not limited particularly but includes polydimethylsiloxane, polymethylphenylsiloxane, etc. The method of blending the silicone oil is not limited particularly but is preferably a method in which it is dissolved in a mixed solution of raw materials containing the polymer (b1) or the copolymer (b2), the copolymer (b3), the styrene monomer (a1) and the acrylic acid alkyl ester (a2) and the above-detailed graft copolymerization.

Also, so long as the rigidity and surface impact strength are not damaged, a thermoplastic block copolymer (C) of a styrene monomer and a diene monomer, the thermoplastic block copolymer having 30 to 50% on a weight basis of the styrene structure units, in addition to the copolymer (A) and rubber particle (B) may be included to increase the impact strength particularly in applications for co-extruded sheets or films. The styrene monomer and diene monomer that constitute the copolymer (C) which can be used may be any of those exemplified in the above-mentioned (b1) to (b3). As the blending method, as in the case of the above-mentioned silicone oil, there is a method in which the copolymer (C) is dissolved in a mixed solution of raw materials for polymerization and the above-mentioned polymerization is performed or a method in which a composition of the copolymer (A) and the rubber particle (B) is produced and then the copolymer (C) is melt-kneaded in an extruder. The latter method involving melt-kneading in an extruder is preferred in respect of easy control of the blending amount of the copolymer (C).

Also, in the present invention, combined use of an isoparaffin polymer in addition to the copolymer (A) and rubber particle (B) can impart plasticity and increase the rigidity and oil resistance of molded products as well as increase the luster of molded products greatly.

The isoparaffin polymer is not limited particularly but includes raw material components of polymers containing as a main ingredient isoolefins such as isobutene, isopentene, isohexene, isoheptene, and isooctene, copolymers of two or more of these isoolefins, copolymers of these isoolefins with other olefins or modification products thereof and their specific structure includes a structure having an isoalkylene unit as a repeating unit as a main structure, a copolymer of an isoalkylene with a 1-alkene and a 2-alkene, or a maleic acid- or phosphorus pentasulfide-modified product having a structure having an isoalkylene unit as a repeating unit, and the like.

Of these isoolefin polymers, copolymers of isobutylene, 1-butene and 2-butene, or polyisobutylene are particularly preferred in respect of oil resistance and plasticizing effect. Also, in the case of the former copolymer, usually the raw material isobutylene contains monomers such as 1-butene and 2-butene in addition to isobutylene and hence a viscous liquid obtained by polymerizing them may be used.

The obtained isoparaffin polymer may be either one of which unsaturated bonds in the molecule thereof are unhydrogenated or hydrogenated. To obtain modification products of the isoolefin polymers, the isoolefin concerned may be polymerized with an unsaturated bond-containing monomer such as maleic acid or phosphorus pentasulfide or unsaturated bonds that exist in the polymer after polymerization of isoolefin may be reacted with the above-mentioned unsaturated bond-containing monomer.

The method of blending the isoparaffin polymer, like the other blending components, is preferably a method in which it is dissolved in a polymerization raw material solution and polymerization is performed.

The isoparaffin polymer has no particular limitation on its molecular weight, etc., but usually it is preferred to have a viscosity of usually 20 to 10,000 cps (38° C.), measured by a BM type viscometer and in particular the range of 50 to 3,000 cps is preferred in respect of excellent mixed dispersibility when mixed with the resin (A) or excellent compatibility with the respective components (a1) to (a3) as well as impact strength, luster and elongation of molded products. From the same reasons, it is preferred that the isoparaffin polymer have a molecular weight of an average molecular weight of 200 to 3,000.

Further, the composition of the present invention may contain if desired known additives, such as plasticizers, e.g., mineral oil, antioxidants, chain transfer agents, and releasing agents, e.g., long chain fatty acids, esters or metal salts thereof. The blending method therefor is preferably a method in which they are dissolved in the polymerization raw material solution and then polymerization is performed like the above-mentioned respective blended components.

The styrene resin composition of the present invention thus obtained may be further blended with usually used antioxidants, plasticizers, ultraviolet absorbents, lubricants, flame retardants, antistatic agents, foaming agents, reinforcing agents, etc.

Specific examples thereof include, for example, mineral oil, ester plasticizers, polyester plasticizers, organic polysiloxanes, higher fatty acids and metal salts thereof, hindered phenol antioxidants, glass fibers, etc., each of which may be used singly or in combination with others. Also, specific examples of the additives usually used for improving weatherability include benzotriazole or benzophenone ultraviolet absorbents represented by Tinuvin P or Tinuvin 327 (Nippon Ciba-Geigy Co., Ltd.), etc., hindered phenol antioxidants represented by Sumilizer GM or GS (Sumitomo Chemical Co., Ltd.), Irganox 1076 (Nippon Ciba-Geigy Co., Ltd.), hindered amine light stabilizer represented by Sanol LS-770, phosphorus antioxidants represented by trisnonylphenyl phosphite, organic sulfur antioxidants represented by dimyristyl thiodipropionate, and the like.

Also, the styrene resin composition of the present invention can be formed into various molded products before use by a molding method such as injection molding single-screw extrusion molding, twin-screw extrusion molding, inflation extrusion molding, contour extrusion molding, vacuum forming, air pressure forming, blow molding, etc., suitable for sheet or film molded products. Their application extends to a wide variety of products and can be used as interior materials for refrigerators, for example, components of home electric appliances such as housings, television sets, air conditioners, and cleaner boxes; various components of OA appliances such as copiers, printers, facsimiles, and personal computers; food vessels; components of medical instruments; sheet wrapping vessels for foods, etc.

Further, to the styrene resin composition of the present invention, there may optionally be added thermoplastic resins such as polystyrene resins, rubber modified polystyrene resins, AS resins, ABS resins, styrene/methyl methacrylate copolymer resins, rubber modified styrene/methyl methacrylate copolymer resins, (meth)acrylic resins, styrene/maleic anhydride copolymer resins, styrene/(meth) acrylic acid copolymer resins, polycarbonate resins, and vinyl chloride resins, if desired. Of these, in particular polystyrene resins, rubber modified polystyrene resins, styrene/methyl methacrylate copolymer resins, and rubber modified/methyl methacrylate copolymer resins are preferred in respect of their excellent compatibility with the rubber modified copolymer resins of the present invention.

Also, since it has a good compatibility with polystyrene resins, rubber modified polystyrene resins, styrene/methyl methacrylate copolymer resins, and rubber modified/methyl methacrylate copolymer resins, the styrene resin composition of the present invention is suitable for recycling runner portions or skeleton portions generated during its molding processing. Further, as other applications, the resin composition of the present invention may be added to a blend of rubber modified polystyrene resin and rubber modified styrene/methyl methacrylate copolymer resin so as to act as a compatibilizing agent to prevent the deterioration of the physical properties of the blend.

EXAMPLES

Hereafter, the present invention will be described in further detail by presenting Examples thereof. All the parts and percentages (%) in the examples are by weight.

Methods for measuring the average particle diameter of the rubbery polymer, the configuration of the dispersed rubber particles, toluene-insoluble solids content, and toluene swelling index and methods for evaluating the physical properties of the rubbery polymer are as follows.

1. Average Particle Diameter of Rubbery Polymer in the Resin

Using DMF as a dispersant, the median diameter on a volume basis of particles in a composition was measured in a dispersion particle size distribution measuring apparatus.

2. Configuration of Rubbery Polymer in the Resin

A transmission electron micrograph (magnification ×10, 000) of a section of resin obtained by an ultra-thin sectioning method was taken and the configuration of dispersed rubber was observed for 1,000 particles in the micrograph and the numbers of particles having a salami structure and of particles having a core-shell structure were obtained.

3. Toluene-insoluble Solids Content and Toluene Swelling Index

One (1) g styrene resin composition was precisely weighed and dissolved in 100 ml of toluene at 25° C. over 24 hours and the resulting solution was transferred in a centrifuge tube, and centrifuged at 10° C. or less at 12,000 rpm for 30 minutes and after removing the supernatant by decantation, the weight of the insoluble solids swelled with toluene was measured. Next, the insoluble solids were dried in a vacuum drier at 60° C. over 24 hours, followed by measuring the weight of the toluene-insoluble solids and calculating toluene-insoluble solids content by the following equation.

Toluene-insoluble solids content=(weight of toluene-insoluble solids after drying/weight of styrene resin composition)×100 (% by weight)

Also, the swelling index was calculated by the following equation.

Swelling index Weight of swelled toluene-insoluble solids/weight of toluene-insoluble solids after drying 4. Flowability MFR values were measured according to JIS K-7210.

5. Izod Impact Value

Notched Izod impact values were measured according to JIS K-6871. Also, as an evaluation of practical strength, a reverse notch was measured by using a 3.2 mm wide specimen, which was attached to a stand such that the symmetrical surface of the specimen was flush with the upper surface of the stand and the notched portion was placed on the opposite side to the direction of impact.

6. Surface Impact Strength

A 0.4 mm thick sheet was prepared by using a 30 mm single-screw extruder and the DuPont impact strength was measured according to JIS K-7211.

7. Flexural Strength and Flexural Modulus

These values were obtained according to JIS K-7113 at a test speed of 50 mm/minute. Note that the specimens were the same as the tensile specimens described in JIS K-6732.

8. Luster

A dumbbell specimen was prepared by injection molding and the luster of each of the plane on the gate portion side and end portion side of the test specimen was measured according to JIS Z-8741 (at an incident angle of 60 degrees).

9. Test on the Chemical Resistance of Molded Products

On a surface of JIS No. 1 dumbbell (thickness: 3 mm, total length: 175 mm) was coated gravure ink containing ethyl acetate and IPA as main ingredients. An end of the specimen was fixed and a 200 g weight was hung on the opposite end and the appearance of the specimen was observed after allowing it to stand at 23° C. at 50% humidity for a predetermined time and evaluated according to the following criteria.

○: Number of cracks occurring in the specimen 0 to 15.

Δ: Number of cracks occurring in the specimen 16 to 40.

×: The specimen was broken.

Example 1

In this example, an apparatus arranged as illustrated in FIG. 1 was used. A mixed solution of styrene, methyl methacrylate, a rubbery polymer and a solvent was sent by a plunger pump 1 to a 20-liter stirring type reactor 2, where initial graft polymerization was performed under dynamic mixing by stirring blades. Then, the resulting mixed solution was sent to a circulation polymerization line I by a gear pump 3. The circulation polymerization line I was constituted by tubular reactors 4, 5 and 6, with 2.5 inch in inner diameters (SMX model static mixer having incorporated therein 30 static mixing elements, manufactured by Gebrueder Sulzer in Switzerland) arranged in order from the inlet thereof and a gear pump 7 for circulating the mixed solution. Between the tubular reactor 6 and the gear pump 7 was provided an outlet continuing to a non-circulation polymerization line II. To the non-circulation polymerization line II were provided in series tubular reactors 8, 9 and 10 similar to those described above in order from the inlet thereof and a gear pump 11.

A mixed solution consisting of 6.4 parts of styrene/butadiene copolymer rubber (viscosity in a 5% styrene solution at 25° C. (hereafter, abbreviated as "5% SV"): 32 centipoises, a styrene/butadiene weight ratio: 5/95), 1.6 parts of styrene/ butadiene copolymer rubber (5% SV: 10 centipoises, a styrene/butadiene weight ratio: 38/62), 85 parts of styrene, 15 parts of methyl methacrylate and 10 parts of ethylbenzene was prepared, to which were added 0.02 part per 100 parts of the monomer mixture of n-dodecyl mercaptan as a chain transfer agent and 0.025 part of t-butyl peroxyisopropyl carbonate per 100 parts of the monomer mixture as an organic peroxide, and 1.5 parts of mineral oil (manufactured by Shima Boeki Co., S-250) and continuously bulk polymerized using the above-mentioned apparatus under the following conditions.

Amount of mixed solution continuously fed: 10 liters/hour;

Reaction temperature in the stirring type reactor 2: 120° C.;

Reaction temperature in the circulation polymerization line I: 135° C.;

Reaction temperature in the non-circulation polymerization line II: 140 to 160° C.;

Recycle ratio: $R=F1/F2=5$.

After heating to 225° C. using a heat exchanger, and removal of the volatile components under reduced pressure of 50 mmHg, the mixed solution obtained by polymerization was pelletized to obtain the styrene resin composition of the present invention.

The rubber modified copolymer resin composition thus obtained was injection molded to prepare specimens and various physical properties thereof were measured. Table 1 shows analysis data and results of measurement of physical properties of the resin.

Figure 2:
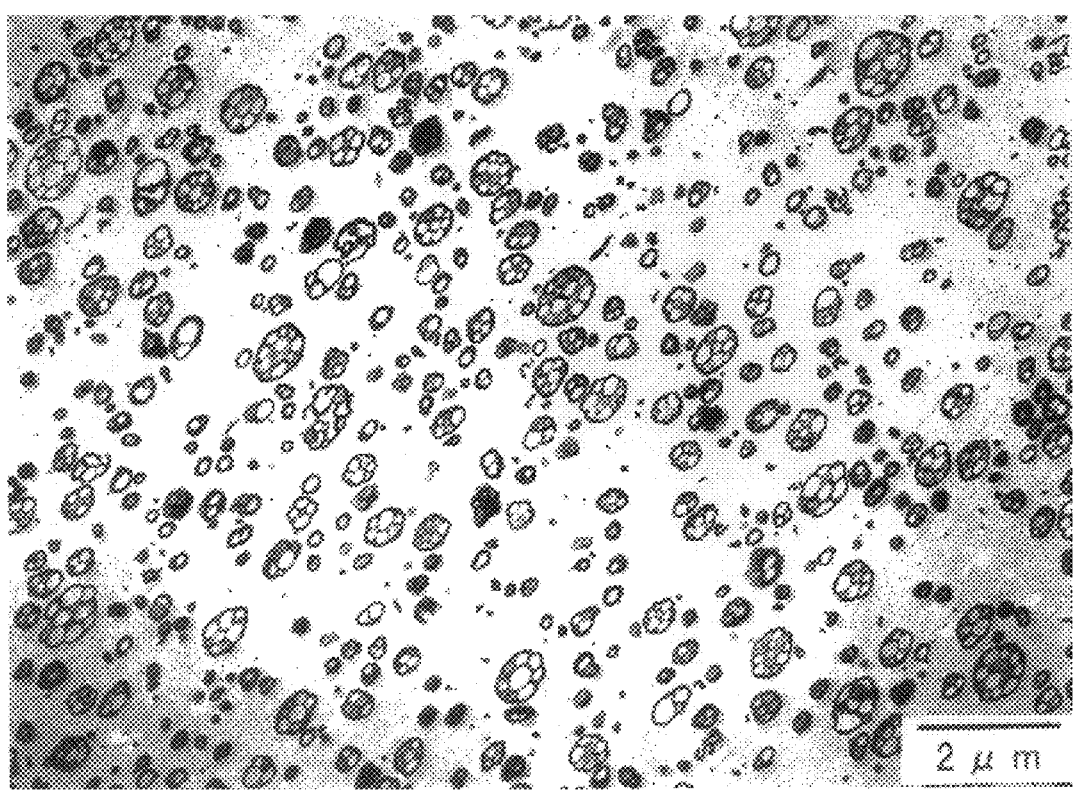
FIG. 2 is a transmission electron micrograph (magnification: ×10,000) of a section of the styrene resin composition of Example I of the present invention obtained by an ultra-thin sectioning method.

Note that FIG. 2 is a transmission electron micrograph (magnification: ×10,00) of a section of the styrene resin composition of Example 1 obtained by an ultra-thin sectioning method.

Example 2

A styrene resin composition of the present invention was prepared in the same manner as in Example 1 except that there was used a mixed solution consisting of 6.4 parts of styrene/butadiene copolymer rubber (5% SV: 32 centipoises, a styrene/butadiene weight ratio: 5/95), 1.6 parts of styrene/butadiene block copolymer rubber (5% SV: 32 centipoises, a styrene/butadiene weight ratio: 40/60), 85 parts of styrene, 15 parts of methyl methacrylate and 10 parts of ethylbenzene. In the same manner as in Example 1, an injection molded product was prepared and various physical properties thereof were measured. Table 1 shows the results.

Example 3

A styrene resin composition of the present invention was prepared in the same manner as in Example 1 except that there was used a mixed solution consisting of 5.6 parts of low cis-polybutadiene (5% SV: 35 centipoises), 2.4 parts of styrene/butadiene copolymer rubber (5% SV: 10 centipoises, a styrene/butadiene weight ratio: 38/62), 90 parts of styrene, 10 parts of methyl methacrylate and 10 parts of ethylbenzene. In the same manner as in Example 1, an injection molded product was prepared and various physical properties thereof were measured. Table 1 shows the results.

Example 4

A styrene resin composition of the present invention was prepared in the same manner as in Example 1 except that there was used a mixed solution consisting of 6.4 parts of styrene/butadiene copolymer rubber (5% SV: 32 centipoises, a styrene/butadiene weight ratio: 5/95), 1.6 parts of styrene/ butadiene copolymer rubber (5% SV: 10 centipoises, a styrene/butadiene weight ratio: 38/62), 85 parts of styrene, 15 parts of methyl methacrylate and 10 parts of ethylbenzene and that 0.025 part per 100 parts of the monomer mixture of n-dodecyl mercaptan as a chain transfer agent and 1.5 parts of isoparaffin copolymer (manufactured by Idemitsu Petroleum Chemistry, Idemitsu Polybutene 35R) in place of the mineral oil were added. In the same manner as in Example 1, an injection molded product was prepared and various physical properties thereof were measured. Table 1 shows the results.

Example 5

A styrene resin composition of the present invention was prepared in the same manner as in Example 1 except that there was used a mixed solution consisting of 6.4 parts of styrene/butadiene copolymer rubber (5% SV: 32 centipoises, a styrene/butadiene weight ratio: 5/95), 1.6 parts of styrene/butadiene copolymer rubber (5% SV: 10 centipoises, a styrene/butadiene weight ratio: 38/62), 83 parts of styrene, 15 parts of methyl methacrylate, 2 parts of butyl acrylate, and 10 parts of ethylbenzene and that 0.025 part per 100 parts of the monomer mixture of n-dodecyl mercaptan as a chain transfer agent was added. In the same manner as in Example 1, an injection molded product was prepared and various physical properties thereof were measured. Table 1 shows the results.

Example 6

A styrene resin composition of the present invention was prepared in the same manner as in Example 1 except that there was used a mixed solution consisting of 6.4 parts of styrene/butadiene copolymer rubber (5% SV: 32 centipoises, a styrene/butadiene weight ratio: 5/95), 1.6 parts of styrene/butadiene copolymer rubber (5% SV: 10 centipoises, a styrene/butadiene weight ratio: 38/62), 65 parts of styrene, 30 parts of methyl methacrylate, 5 parts of butyl acrylate, and 10 parts of ethylbenzene and that 0.025 part per 100 parts of the monomer mixture of n-dodecyl mercaptan as a chain transfer agent was added. In the same manner as in Example 1, an injection molded product was prepared and various physical properties thereof were measured. Table 1 shows the results.

Comparative Example 1

Using a mixed solution consisting of 8 parts of low cis-polybutadiene (5% SV: 35 centipoises), 92 parts of styrene, and 10 parts of ethylbenzene, to which was added 0.01 part per 100 parts of the monomer mixture of n-dodecyl mercaptan as a chain transfer agent and 0.02 part of per 100 parts of the monomer mixture of t-butyl peroxybenzoate as an organic peroxide, and 1.5 parts of mineral oil (manufactured by Shima Boeki Co., S-250), and the resulting mixture was continuously bulk polymerized using the above-mentioned apparatus under the following conditions.

Amount of mixed solution continuously fed: 10 liters/hour;
Reaction temperature in the stirring type reactor 2: 130° C.;
Reaction temperature in the circulation polymerization line I: 135° C.;
Reaction temperature in the non-circulation polymerization line II: 140 to 170° C.;
Recycle ratio: R=F1/F2=5.

After heating to 225° C. using a heat exchanger, and removal of the volatile components under reduced pressure of 50 mmHg, the mixed solution obtained by polymerization was pelletized to obtain a rubber modified copolymer resin composition. Table 2 shows analysis data and results of measurement of physical properties of the resin.

Comparative Example 2

A comparative styrene resin composition was prepared in the same manner as in Example 1 except that there was used a mixed solution consisting of 10 parts of styrene/butadiene copolymer rubber (5% SV: 10 centipoises, a styrene/butadiene weight ratio: 38/62), 85 parts of styrene, 15 parts of methyl methacrylate and 12 parts of ethylbenzene. In the same manner as in Example 1, an injection molded product was prepared and various physical properties thereof were measured. Table 2 shows the results.

Comparative Example 3

A comparative styrene resin composition was prepared in the same manner as in Example 1 except that there was used a mixed solution consisting of 10 parts of styrene/butadiene copolymer rubber (5% SV: 10 centipoises, a styrene/butadiene weight ratio: 38/62), 48 parts of styrene, 52 parts of methyl methacrylate and 10 parts of ethylbenzene. In the same manner as in Example 1, an injection molded product was prepared and various physical properties thereof were measured. Note that the measurement of luster was performed by melt-kneading the obtained resin composition with titanium white to obtain a non-transparent molded product, for which measurement was made. Table 2 shows the results.

Comparative Example 4

A comparative styrene resin composition was prepared in the same manner as in Comparative Example 1 except that there was used a mixed solution consisting of 8 parts of low cis-polybutadiene (5% SV: 25 centipoises), 92 parts of styrene, and 10 parts of ethylbenzene and further 0.015 part per 100 parts of the monomer mixture of n-dodecyl mercaptan as a chain transfer agent. In the same manner as in Comparative Example 1, an injection molded product was prepared and various physical properties thereof were measured. Table 2 shows the results.

Comparative Example 5

A comparative styrene resin composition was prepared in the same manner as in Example 1 except that there was used a mixed solution consisting of 8 parts of styrene/butadiene copolymer rubber (5% SV: 32 centipoises, a styrene/butadiene weight ratio: 5/95), 30 parts of styrene, 65 parts of methyl methacrylate, 5 parts of butyl acrylate and 14 parts of ethylbenzene and further 0.025 part per 100 parts of the monomer mixture of n-dodecyl mercaptan as a chain transfer agent. In the same manner as in Example 1, an injection molded product was prepared and various physical properties thereof were measured. Note that the measurement of luster was performed by melt-kneading the obtained resin composition with titanium white to obtain a non-transparent molded product, for which measurement was made. Table 2 shows the results.

TABLE 1

| Item | Example 1 | 2 | 3 | 4 | 5 | 6 |
|---|---|---|---|---|---|---|
| Rubber content (%) | 9.0 | 9.0 | 9.0 | 9.0 | 9.0 | 9.5 |
| Average rubber particle diameter (μm) | 0.65 | 0.64 | 0.71 | 0.65 | 0.68 | 0.64 |
| Toluene-insoluble solids content (%) | 16.8 | 17.6 | 17.8 | 17.0 | 17.3 | 15.8 |
| Swelling index (–) | 12.3 | 12.0 | 10.9 | 12.3 | 11.9 | 12.6 |
| Toluene-insoluble solids content/swelling index | 1.37 | 1.47 | 1.63 | 1.38 | 1.45 | 1.25 |
| Matrix phase Mw (×10$^4$) | 16 | 17 | 16 | 16 | 16 | 15 |
| Matrix phase Mw/Mn (–) | 2.2 | 2.1 | 2.1 | 2.1 | 2.1 | 2.0 |
| Salami/core-shell ratio | 8/2 | 8/2 | 7/3 | 8/2 | 8/2 | 8/2 |
| MFR (g/10 min) | 3.0 | 2.8 | 3.5 | 5.0 | 6.0 | 4.5 |
| Izod impact strength (kg.cm/cm) | | | | | | |
| Notched | 8.7 | 9.2 | 9.5 | 9.2 | 8.8 | 9.4 |
| Reverse notched | 85 | 90 | 95 | 95 | 90 | 95 |
| Surface impact strength (J) | 1.2 | 1.2 | 1.1 | 1.3 | 1.3 | 1.4 |
| Flexural strength (kg/cm$^2$) | 625 | 650 | 580 | 630 | 600 | 650 |
| Flexural modulus × 10$^4$ (kg/cm$^2$) | 2.53 | 2.65 | 2.54 | 2.58 | 2.50 | 2.62 |
| Luster | | | | | | |
| (on the gate side) | 94 | 94 | 93 | 96 | 96 | 94 |
| (on the end side) | 93 | 92 | 92 | 94 | 95 | 92 |
| Chemical resistance | ○ | ○ | ○ | ○ | ○ | Δ |

TABLE 2

| Item | Comparative Example 1 | 2 | 3 | 4 | 5 |
|---|---|---|---|---|---|
| Rubber content (%) | 9.5 | 11.0 | 11.0 | 9.5 | 10.0 |
| Average rubber particle diameter (μm) | 1.0 | 0.45 | 0.65 | 0.65 | 0.85 |
| Toluene-insoluble solids content (%) | 13.6 | 5.3 | 14.2 | 13.5 | 17.2 |
| Swelling index (–) | 12.4 | 14.0 | 13.9 | 12.2 | 10.1 |
| Toluene-insoluble solids content/swelling index | 1.10 | 0.38 | 1.02 | 1.11 | 1.70 |
| Matrix phase Mw (×10$^4$) | 19 | 16 | 15 | 19 | 16 |
| Matrix phase Mw/Mn (–) | 2.2 | 2.2 | 2.2 | 2.2 | 2.0 |
| Salami/core-shell ratio | 10/0 | 0/10 | 5/— | 10/0 | 10/0 |
| MFR (g/10 min) | 3.0 | 3.3 | 3.1 | 4.5 | 0.5 |
| Izod impact strength (kg.cm/cm) | | | | | |
| Notched | 7.0 | 4.0 | 7.5 | 7.0 | 8.5 |
| Reverse notched | 45 | 10 | 65 | 30 | 80 |
| Surface impact strength (J) | 0.8 | 0.4 | 0.8 | 0.5 | 0.9 |
| Flexural strength (kg/cm$^2$) | 490 | 610 | 660 | 500 | 720 |
| Flexural modulus ×10$^4$ (kg/cm$^2$) | 2.24 | 2.41 | 2.51 | 2.27 | 2.70 |
| Luster | | | | | |
| (on the gate side) | 85 | 96 | 94 | 95 | 88 |
| (on the end side) | 83 | 93 | 91 | 92 | 86 |
| Chemical resistance | Δ | Δ | x | Δ | x |

INDUSTRIAL APPLICABILITY

According to the present invention, a styrene resin composition that is excellent in luster, rigidity and surface impact strength can be provided. In particular, when the matrix contains a small amount of acrylic components, the resin composition can be used by recycling it in such a manner as blending recovered products in polystyrene while retaining the performance of the present invention such as luster, impact strength, and rigidity of molded products, and in addition improving the chemical resistance of the molded products.

Therefore, the styrene resin composition of the present invention can be used in various molded products advantageously and in particular when it is molded into sheet forms, it has remarkably excellent luster, impact resistance and rigidity.

What is claimed is:

1. A styrene resin composition having a copolymer (A) of a styrene monomer and an acrylic monomer as a matrix phase, and rubber particles (B) comprising a diene rubbery polymer with which a styrene monomer and an acrylic monomer are graft coplymerized as dispersed particles,
    wherein the copolymer (A) is a copolymer of the styrene monomer and the (meth)acrylic acid alkyl ester in a proportion of the former/latter=95/5 to 50/50 on a weight basis, the rubber particles (B) have a median diameter in the range of 0.5 to 0.9 μm on a volume basis, the rubber particles (B) include both (B1) rubber particles having a salami structure and (B2) rubber particles having a core-shell structure, the rubber particles (B1) and the rubber particles (B2) as measured by observing 1,000 particles by transmission electron micrograph (magnification: 10,000×1) is (B1)/(B2)= 70/30 to 95/5, and a value of (toluene-insoluble solids content at 25° C./toluene swelling index at 25° C.) is in the range of 1.2 to 2.5.

2. The composition as claimed in claim 1, wherein the rubber particles (B) show a single-peak particle size distribution on a volume basis as measured by a dispersion particle size measuring apparatus.

3. The composition as claimed in claim 1, wherein the copolymer (A) is a copolymer of a styrene monomer and a (meth)acrylic acid alkyl ester in a proportion of the former/latter=95/5 to 81/19 on a weight basis.

4. The composition as claimed in claim 3, wherein the copolymer (A) has a weight-average molecular weight of 140,000 to 200,000.

5. The composition as claimed in claim 1, further comprising an isoparaffin polymer in addition to the copolymer (A) and the rubber particles (B).

6. The composition as claimed in claim 1, further comprising a silicone oil in addition to the copolymer (A), the rubber particles (B1), and the rubber particles (B2).

7. The composition as claimed in claim 1, further comprising (C) a thermoplastic block copolymer of a styrene monomer and a diene monomer, the thermoplastic block copolymer having 30 to 50% on a weight basis of the styrene structure units.

8. A method for producing a styrene resin composition claimed in claim 1, comprising continuously bulk polymerizing, in a continuous bulk polymerization line having incorporated therein a tubular reactor with a plurality of mixing elements that have no mobile part fixed inside thereof, a mixed solution of (b1) a homopolymer of a diene monomer, or (b2) a copolymer of a styrene monomer and a diene monomer, the copolymer having 15% or less on a weight basis of the styrene structure units, and (b3) a copolymer of a styrene monomer and a diene monomer, the copolymer having 20 to 50% on a weight basis of the styrene structure units, (a1) a styrene monomer, and (a2) a (meth)acrylic acid alkyl ester.

9. The production method as claimed in claim 8, comprising melt-mixing (b1) a homopolymer of a diene monomer, or (b2) a copolymer of a styrene monomer and a diene monomer, the copolymer having 15% or less on a weight basis of the styrene structure units, and (b3) a copolymer of a styrene monomer with a diene monomer, the copolymer having 20 to 50% on a weight basis of the styrene structure units, a styrene monomer (a1), and a (meth)acrylic acid alkyl ester (a2), polymerizing the resulting solution in a least one stirring reactor, and introducing the reaction mixture into a tubular reactor.

10. The production method as claimed in claim 9, comprising using a polymerization line constituted by a. a stirring reactor, b. an initial polymerization line connected to the stirring type reactor, comprising at least one tubular reactor having a plurality of mixing elements having no mobile part fixed therein, c. a main polymerization line connected to the stirring type reactor, comprising at least one tubular reactor having a plurality of mixing elements having no mobile part fixed therein, and d. a recycle line branching between the initial polymerization line and the main polymerization line, and polymerizing therein (b1) a homopolymer of a diene monomer, or (b2) a copolymer of a styrene monomer and a diene monomer, the copolymer having 15% or less on a weight basis of the styrene structure units, and the copolymer (b3) a copolymer of a styrene monomer and a diene monomer, the copolymer having 20 to 50% on a weight basis of the styrene structure units, the styrene monomer (a1), and the (meth)acrylic acid alkyl ester (a2), wherein a portion of initial polymerization solution is recycled to initial polymerization line through a recycle line while non-recycled portion of the initial polymerization solution is polymerized in a main polymerization line.

11. The production method as claimed in claim 8, wherein the homopolymer (b1) of a diene monomer, or the copolymer (b2) of styrene monomer and a diene monomer, the copolymer having 15% or less on a weight basis of the styrene structure units, and the copolymer (b3) of a styrene monomer and a diene monomer, the copolymer having 20 to 50% on a weight basis of the styrene structure units, are used in a proportion of ((b1) or (b2))/(b3)=95/5 to 60/40.

12. The production method as claimed in claim 8, further comprising an isoparaffin polymer in addition to the polymer (b1) or the copolymer (b2) and the copolymer (b3)

the styrene monomer (a1), and the (meth)acrylic acid alkyl ester (a2).

13. The production method as claimed in claim 8, further comprising a silicone oil in addition to the polymer (b1) or the copolymer (b2) and the copolymer (b3)

the styrene monomer (a1), and the (meth) acrylic acid alkyl ester (a2).

* * * * *